United States Patent
Krishnamurthy

(10) Patent No.: US 9,231,859 B2
(45) Date of Patent: Jan. 5, 2016

(54) SYSTEM AND METHOD FOR INGRESS PORT IDENTIFICATION IN AGGREGATE SWITCHES

(71) Applicant: Dell Products L.P., Round Rock, TX (US)

(72) Inventor: Karthik Krishnamurthy, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 326 days.

(21) Appl. No.: 13/781,552

(22) Filed: Feb. 28, 2013

(65) Prior Publication Data

US 2014/0241374 A1    Aug. 28, 2014

(51) Int. Cl.
| | |
|---|---|
| H04L 12/28 | (2006.01) |
| H04L 12/709 | (2013.01) |
| H04L 12/935 | (2013.01) |
| H04L 12/939 | (2013.01) |

(52) U.S. Cl.
CPC .......... *H04L 45/245* (2013.01); *H04L 49/3009* (2013.01); *H04L 49/552* (2013.01)

(58) Field of Classification Search
CPC ...................................................... H04L 45/245
USPC ............................................................ 370/401
See application file for complete search history.

(56) References Cited

U.S. PATENT DOCUMENTS

| | | | |
|---|---|---|---|
| 2007/0183415 A1* | 8/2007 | Fischer et al. ................. | 370/389 |
| 2008/0240111 A1* | 10/2008 | Gadelrab .................... | 370/395.7 |
| 2009/0097406 A1* | 4/2009 | Nilakantan et al. ........... | 370/235 |
| 2011/0299535 A1* | 12/2011 | Vobbilisetty et al. .......... | 370/392 |
| 2013/0258858 A1* | 10/2013 | Cherian et al. ................ | 370/241 |
| 2013/0268590 A1* | 10/2013 | Mahadevan et al. .......... | 709/204 |

* cited by examiner

*Primary Examiner* — Shripal Khajuria
(74) *Attorney, Agent, or Firm* — Haynes and Boone, LLP

(57) ABSTRACT

A system and method for ingress port identification in aggregate switches includes a network switching device including a controller, a first port coupling the network switching device to another network device, and one or more forwarding information tables being maintained by the controller. The network switching device is configured to receive a first packet at the first port, replicate the first packet, insert a first reserved ingress ID associated with the first port into the replicated first packet, and forward the replicated first packet to a first peer switch. The network switching device is part of an aggregate switch.

20 Claims, 7 Drawing Sheets

SYSTEM AND METHOD FOR INGRESS PORT IDENTIFICATION IN AGGREGATE SWITCHES

BACKGROUND

The present disclosure relates generally to information handling systems, and more particularly to ingress port identification in aggregate switches.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization and/or aggregate switches.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion using virtual link trunking (VLT). In a VLT, multiple network links and/or nodes are often bundled into a group to support the parallelization function. For suitably aware network switching products, the VLT can offer a flexible option to select any of the network links in the VLT. The network switching products may also ignore the VLT and treat the network links as separate links and utilize them in a more traditional fashion. And while VLTs offer additional flexibility in network topologies they also add complexity to the forwarding function.

One function of network switching products is to identify and share information related to the networks the network switching products are receiving network packets from or forwarding packets to. In some examples, the network switching products should be able to learn the identity of other network devices they receive network traffic from and to share what they've learned with other network switching products they are aggregated with. In some examples, the network switching products should be able to rapidly and reliably share forwarding information with the other network switching products they are aggregated with.

Accordingly, it would be desirable to provide improved network switching products that can share and communicate forwarding information while minimizing adverse impact on network traffic. It would also be desirable to provide network switching products that can share and communicate forwarding information while taking advantage of the features of VLTs.

SUMMARY

According to one embodiment, a network switching device includes a controller, a first port coupling the network switching device to another network device, and one or more forwarding information tables being maintained by the controller. The network switching device is configured to receive a first packet at the first port, replicate the first packet, insert a first reserved ingress ID associated with the first port into the replicated first packet, and forward the replicated first packet to a first peer switch. The network switching device is part of an aggregate switch.

According to another embodiment, a method of ingress packet handling includes receiving a first packet at a first port coupling a network switching device to another network device, replicating the first packet to form a replicated packet, inserting a first reserved ingress ID associated with the first port into the replicated packet, and forwarding the replicated packet to a peer switch.

According to yet another embodiment, an information handling system includes a communications network. The communications network includes an aggregate switch. The aggregate switch includes a first network switching device, a second network switching device, and an inter-chassis link (ICL) coupling the first network switching device to the second network switching device. The first network switching device includes a first controller, a port coupling the first network switching device to another network device, and one or more first forwarding information tables being maintained by the first controller. The second network switching device includes a second controller, and one or more second forwarding information tables being maintained by the second controller. The first network switching device is configured to receive a packet at the port, replicate the packet, insert a reserved ingress ID associated with the port into the replicated packet, and forward the replicated packet to the second network switching device using the ICL.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
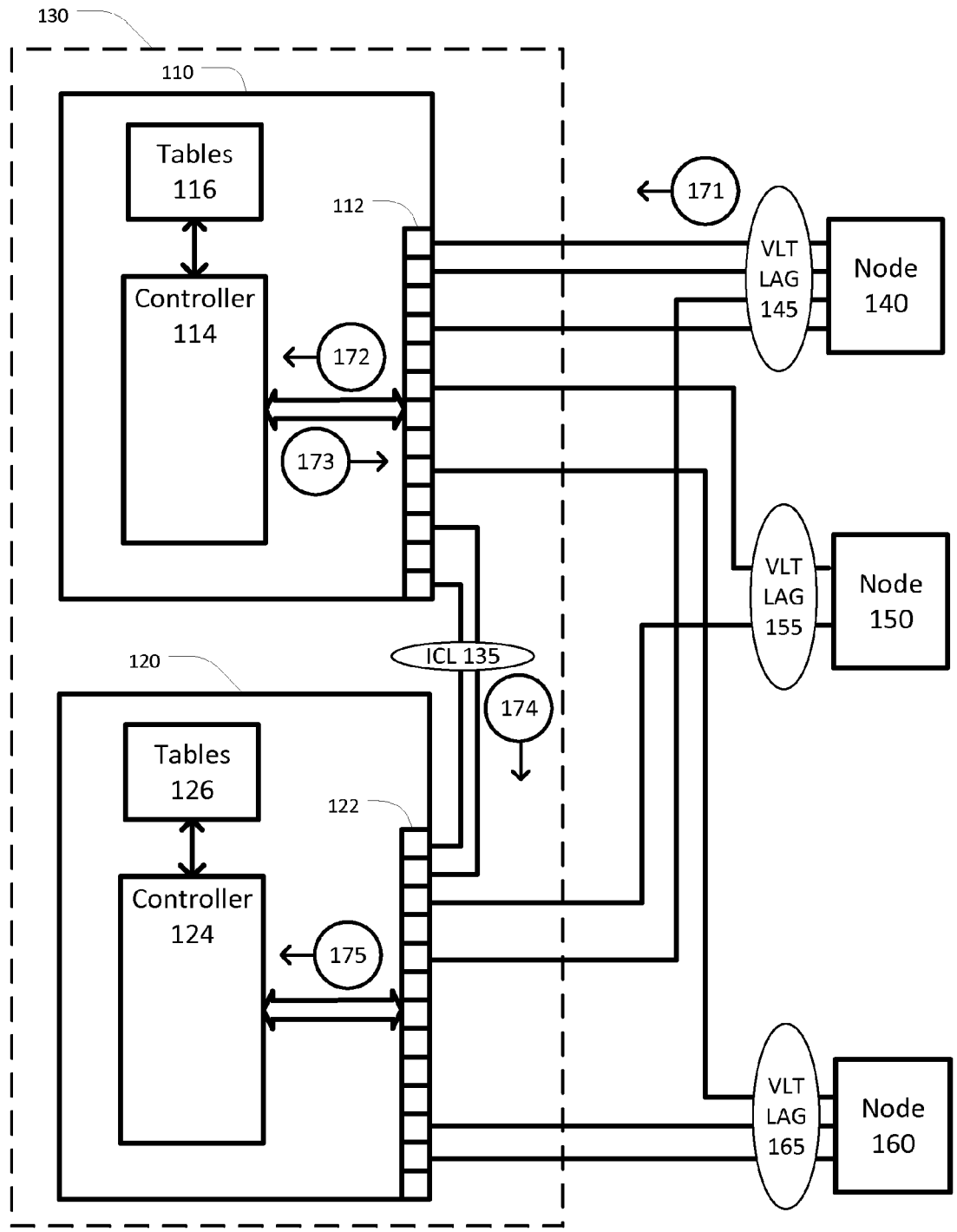
FIG. 1 is a simplified diagram of a network including several VLTs according to some embodiments.

FIG. 1 is a simplified diagram of a network including several VLTs according to some embodiments. As shown in FIG. 1, the network includes a network switching device or switch 110 coupled to several network switching devices and/or network nodes using one or more ports 112. Switch 110 also includes a controller 114. In some examples, the controller 114 may include one or more processors. The controller 114 is coupled to one or more forwarding information tables 116. The one or more forwarding information tables 114 may include forwarding and/or routing information used by switch 110 to forward network traffic using the one or more ports 112. In some examples, the one or more forwarding information tables 114 may include a media access control (MAC) table, a layer 3 (L3) table, and/or other tables and data structures.

The network also includes a switch 120 coupled to several network switching devices and/or network nodes using one or more ports 122. Switch 120 also includes a controller 124. In some examples, the controller 124 may include one or more processors. The controller 124 is coupled to one or more forwarding information tables 126. The one or more forwarding information tables 124 may include forwarding and/or routing information used by switch 120 to forward network traffic using the one or more ports 122. In some examples, the one or more forwarding information tables 124 may include a MAC table, a L3 table, and/or other tables and data structures.

In the network of FIG. 1, the switches 110 and 120 are further aggregated into an aggregate switch 130. In some examples, the aggregate switch 130 may be a stacked switch. In some examples, the aggregate switch 130 may be a peer group. In some examples, switches 110 and 120 may be referred to as peer switches. Switches 110 and 120 are also coupled together using one or more network links that form an inter-chassis link (ICL) 135. Although only two network links are shown in ICL 135, any number of network links may be used in ICL 135. The one or more network links in the ICL 135 couple one or more of the one or more ports 112 to one or more of the one or more ports 122. In some examples, the network links in the ICL 135 may be configured as a link aggregation group (LAG). The ICL LAG 135 allows both switch 110 and switch 120 to refer collectively to any of the network links. In some examples, switches 110 and 120 may use the ICL 135 to exchange management information. In some examples, the management information includes forwarding information. Although the aggregate switch 130 is shown with only two switches 110 and 120, the aggregate switch 130 may include more than two switches.

The network of FIG. 1 further includes a network device or node 140. In some examples, the node 140 may be a switch. The node 140 is coupled to both switch 110 and switch 120 of the aggregate switch 130. As shown, node 140 is coupled to switch 110 using two network links and to switch 120 using one network link, although any number of network links may be used to couple node 140 to switch 110 and to switch 120. In some examples, because node 140 is coupled to both switch 110 and switch 120, a VLT LAG 145 may be formed between the node 140 and the aggregate switch 130. In some examples, when node 140 uses the VLT LAG 145 to forward network traffic via the aggregate switch 130 it does not need to know whether switch 110 or switch 120 handles the network traffic. This is one of the advantages of VLTs and VLT LAGs.

The network of FIG. 1 further includes a network device or node 150. In some examples, the node 150 may be a switch. The node 150 is coupled to both switch 110 and switch 120 of the aggregate switch 130. As shown, node 150 is coupled to switch 110 using one network link and to switch 120 using one network link, although any number of network links may be used to couple node 150 to switch 110 and to switch 120.

In some examples, because node 150 is coupled to both switch 110 and switch 120, a VLT LAG 155 may be formed between the node 150 and the aggregate switch 130. In some examples, when node 150 uses the VLT LAG 155 to forward network traffic via the aggregate switch 130 it does not need to know whether switch 110 or switch 120 handles the network traffic.

The network of FIG. 1 further includes a network device or node 160. In some examples, the node 160 may be a switch. The node 160 is coupled to both switch 110 and switch 120 of the aggregate switch 130. As shown, node 160 is coupled to switch 110 using one network link and to switch 120 using two network links, although any number of network links may be used to couple node 160 to switch 110 and to switch 120. In some examples, because node 160 is coupled to both switch 110 and switch 120, a VLT LAG 165 may be formed between the node 160 and the aggregate switch 130. In some examples, when node 160 uses the VLT LAG 165 to forward network traffic via the aggregate switch 130 it does not need to know whether switch 110 or switch 120 handles the network traffic.

Because of the VLT LAGs 145, 155, and 165, switches 110 and 120 need to share forwarding information. Both switch 110 and switch 120 need to be able to forward any of the network traffic received by the aggregate switch 130. This is what allows nodes 140, 150, and/or 160 to forward network traffic to the aggregate switch 130 without having to be concerned with whether switch 110 or switch 120 receives the network traffic. In some embodiments, switches 110 and 120 may share the forwarding information using message passing.

As shown in FIG. 1, node 140 is transmitting a packet 171 to the aggregate switch 130 using the VLT LAG 145. The LAG hashing mechanism of VLT LAG 145 selects one of the network links in the VLT LAG 145 and hashes packet 171 to switch 110. In some examples, packet 171 may be one packet from network traffic being transmitted by node 140. In some examples, when switch 110 receives packet 171, switch 110 may forward packet 171 as packet 172 to the controller 114. In some examples, when the controller 114 receives packet 172 it may determine that packet 172 indicates new forwarding information. In some examples, packet 172 may include a source IP address that switch 110 may use to learn that the source IP address is reachable using node 140. Any new forwarding information associated with packet 172 may then be stored in the one or more forwarding information tables 116. Switch 110 now needs to notify switch 120 of the new forwarding information associated with VLT LAG 145 because the VLT LAG 145 includes ports on both switches 110 and 120. Controller 114 creates a forwarding information packet/message 173 to be sent to switch 120. Packet 173 is then forwarded to ICL 135 and transmitted over ICL 135 as a packet 174. When packet 174 is received at switch 120 it is forwarded to controller 124 as a packet 175. When the controller 124 receives the packet 175 it updates the one or more forwarding information tables 126 to include the new forwarding information associated with VLT LAG 145.

However, in some examples, synchronization of forwarding information between switches 110 and 120 may be subject to practical limitations. In some examples, controller 114 may introduce delays in the handling of packet 172 or even drop packet 172. In some examples, packet 172 may be stored in an ingress queue included in controller 114 and may not be processed immediately. In some examples, controller 114 may require a certain amount of CPU time in order to process packet 172. In some examples, after processing in controller 114, packet 173 may be delayed in one or more queues before being forwarded over the ICL 135 as packet 174. In some examples, similar delays may occur when packet 174 is received at switch 120 and forwarded to controller 124 as packet 175 for further processing. In some examples, a total delay may be significant. In some examples, the total delay may take several seconds. In some examples, this may result in undesirable behavior due to the lack of synchronization between forwarding information in the one or more forwarding information tables 116 and the one or more forwarding information tables 126.

Figure 2:
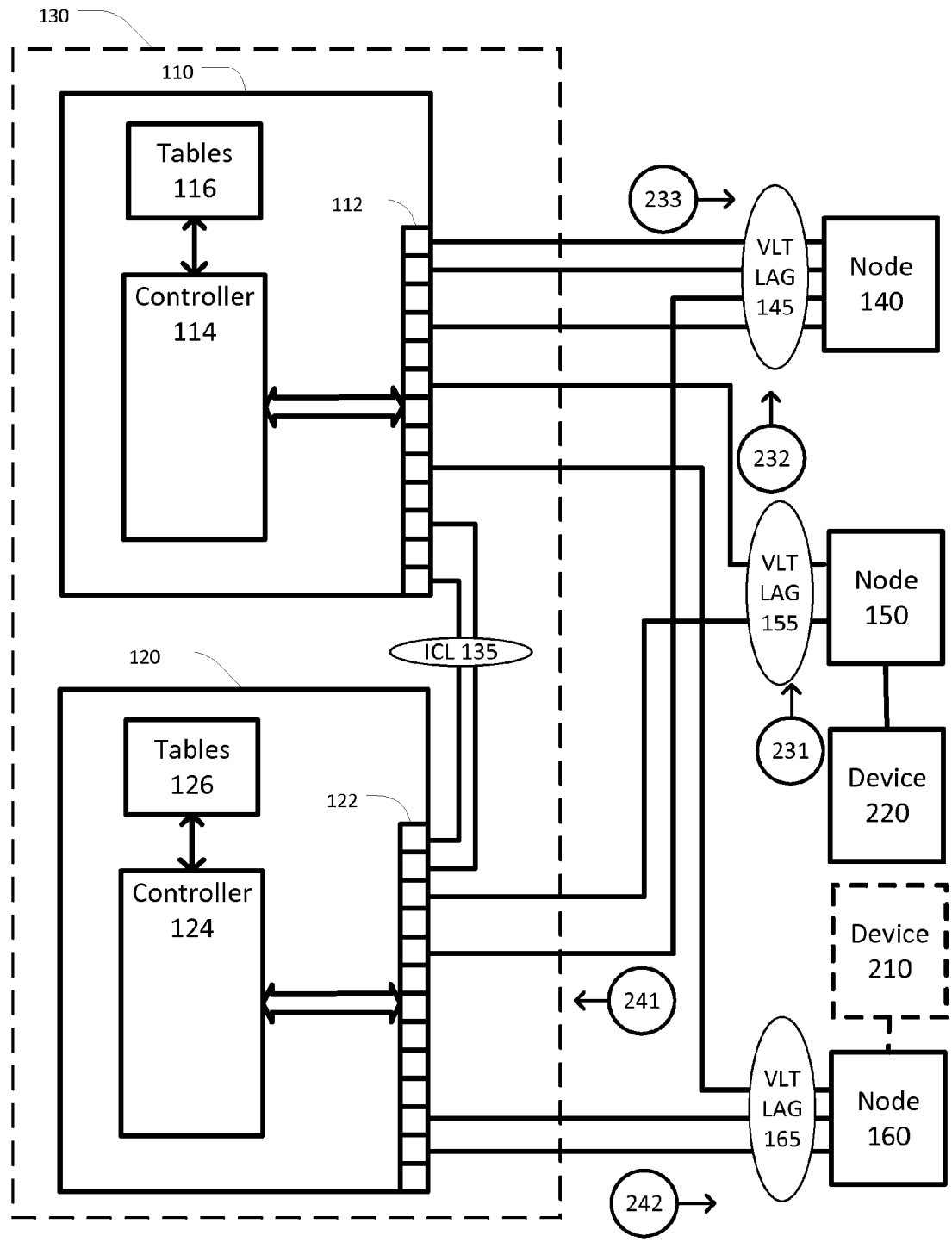
FIG. 2 is a simplified diagram of a forwarding error caused by a delay in synchronization of forwarding information in the network of FIG. 1 when a network topology changes according to some embodiments.

FIG. 2 is a simplified diagram of a forwarding error caused by a delay in synchronization of forwarding information in the network of FIG. 1 when a network topology changes according to some embodiments. As shown in FIG. 2, a network device 210 has been relocated from being coupled to node 160 to being coupled to node 150 as device 220. In some examples, this may be a result of a MAC move. Initially, neither switch 110 nor switch 120 may be aware of the change from device 210 to device 220. In some examples, device 220 may transmit a packet 231 to node 150. The packet 231 may include a destination address that corresponds to node 140 (or beyond node 140 in the network). Based on the forwarding information in node 150, node 150 forwards packet 231 using VLT LAG 155 which hashes packet 231 to switch 110 as a packet 232. When packet 232 is received at switch 110 the one or more forwarding information tables 116 indicate that packet 232 is to be forwarded to node 140 using VLT LAG 145 and it is forwarded as a packet 233.

Switch 110 may recognize that even though packet 232 originated at device 220, it arrived from node 150 over VLT LAG 155 rather than from node 160 via VLT LAG 165. Switch 110 may also recognize that the MAC move has occurred and begins the process of updating its own one or more forwarding information tables 116 to direct future network traffic for device 220 using VLT LAG 155 and node 150. Switch 110 also begins the process of notifying its peer switch, switch 120, of the MAC move.

In some examples, node 140 may then transmit a response to packet 233. The response needs to be sent to device 220. As a result of receiving packet 233 using VLT LAG 145, node 140 recognizes that device 220 may be reached using VLT LAG 145 and sends the response to VLT LAG 145. From VLT LAG 145 the response is hashed toward switch 120 and is forwarded as a packet 241. Unfortunately, switch 120 has not yet received the MAC move notification from switch 110 and forwards packet 241 using VLT LAG 165 to node 160 as a packet 242 because the forwarding information tables 126 still indicate that device 210 is reachable using VLT LAG 165. In some examples, switch 120 may continue to erroneously forward packets for device 220 using VLT LAG 165 until it receives the MAC move notification from switch 110. Consequently, it would be advantageous for switch 120 to receive the MAC move notification as rapidly as possible to avoid erroneously forwarding packets to an incorrect switch or device.

Figure 3:
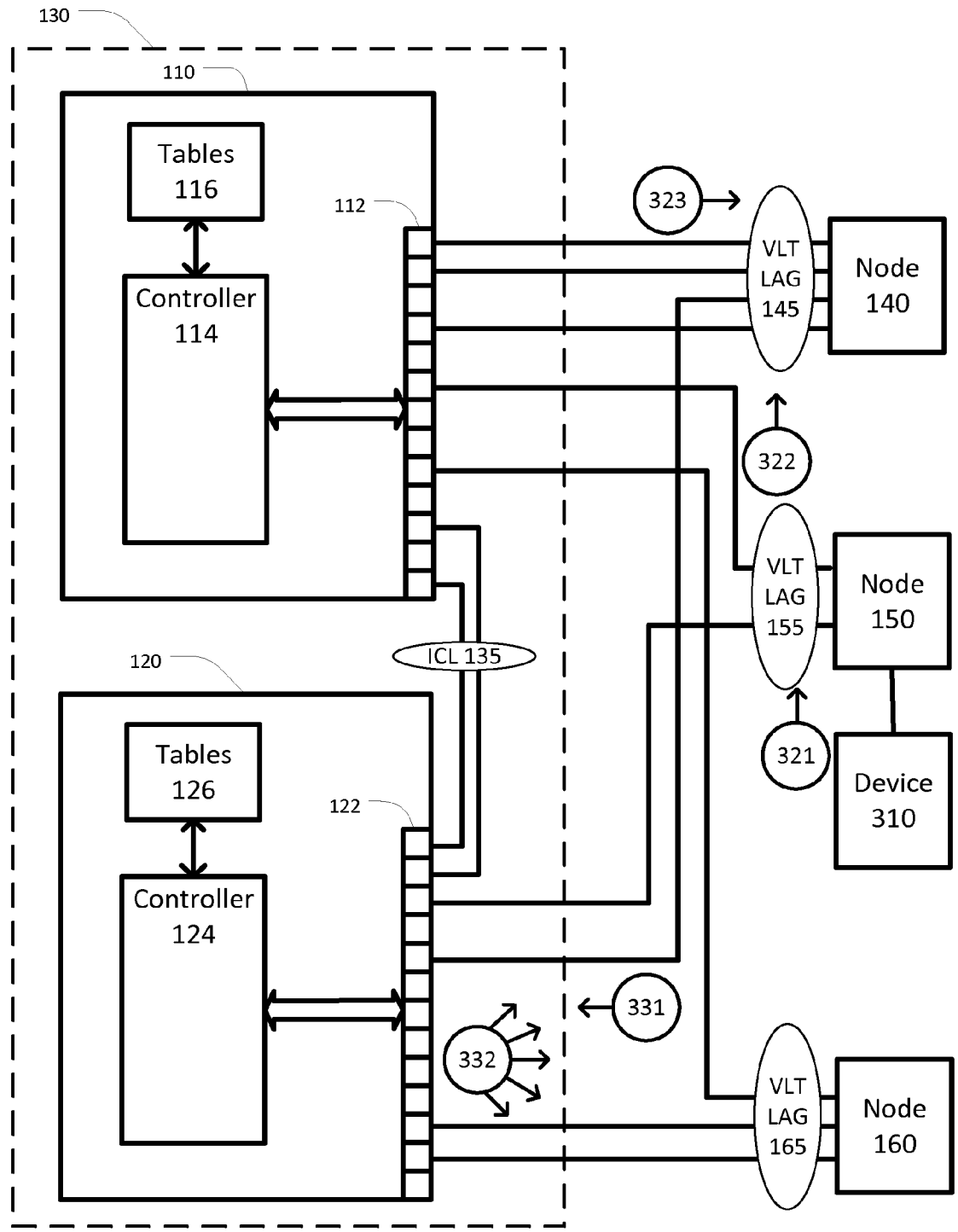
FIG. 3 is a simplified diagram of undesirable flooding caused by a delay in synchronization of forwarding information in the network of FIG. 1 according to some embodiments.

FIG. 3 is a simplified diagram of undesirable flooding caused by a delay in synchronization of forwarding information in the network of FIG. 1 according to some embodiments. As shown in FIG. 3, a network device 310 is coupled to node 150. In some examples, device 310 may transmit a packet 321 to node 150. The packet 321 may include a destination address that corresponds to node 140 (or beyond node 140 in the network). Based on the forwarding information in node 150, node 150 forwards packet 321 using VLT LAG 155 where packet 321 gets hashed to switch 110 as a packet 322. When packet 322 is received at switch 110 the one or more forwarding information tables 116 indicate that packet 322 is to be forwarded to node 140 using VLT LAG 145 and it is forwarded as a packet 323.

In some examples, switch 110 recognizes that packet 322 may be a first packet received at switch 110 (and aggregate switch 130 as well) from device 310 and learns that device 310 may be reached using VLT LAG 155 and node 150. Switch 110 begins the process of updating its own one or more forwarding information tables 116 to direct future network traffic for device 310 using VLT LAG 155 and node 150. Switch 110 also begins the process of notifying its peer switch, switch 120, of the reachability of device 310 using VLT LAG 155.

In some examples, node 140 may then transmit a response to packet 323. The response needs to be sent to device 310. As a result of receiving packet 323 using VLT LAG 145, node 140 recognizes that device 310 may be reached using VLT LAG 145 and sends the response to VLT LAG 145. From VLT LAG 145 the response is hashed as a packet 331, which is sent to switch 120. Unfortunately, switch 120 has not yet received the reachability notification from switch 110 and broadcasts or floods a packet 332 to its other ports hoping that one of the nodes or devices coupled thereby knows of a path to device 310. Consequently, it would be advantageous for switch 120 to receive the reachability notification as rapidly as possible to avoid unnecessarily flooding packets on the network.

Figure 4:
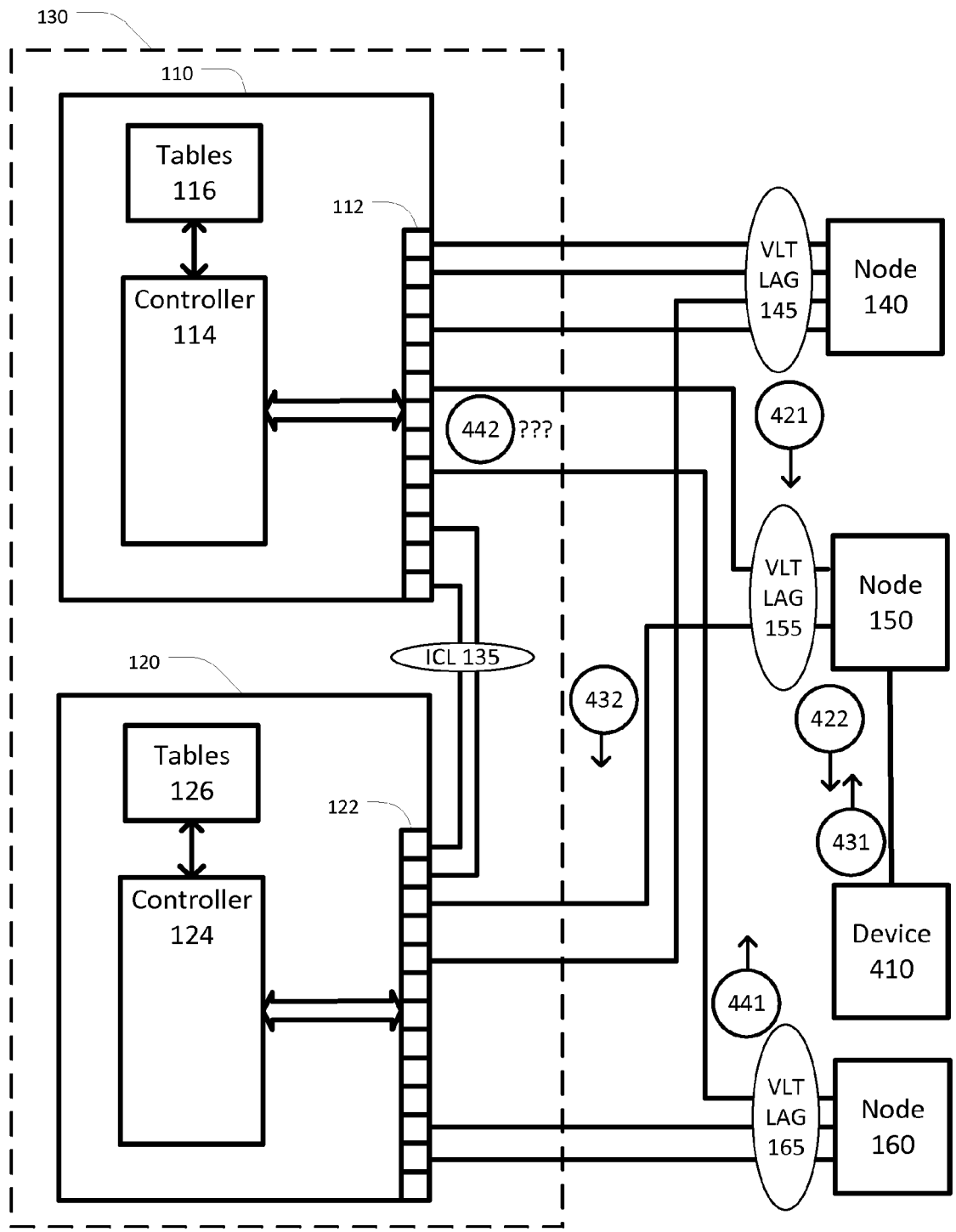
FIG. 4 is a simplified diagram of Address Resolution Protocol (ARP) failure caused by a delay in synchronization of forwarding information in the network of FIG. 1 according to some embodiments.

FIG. 4 is a simplified diagram of Address Resolution Protocol (ARP) failure caused by a delay in synchronization of forwarding information in the network of FIG. 1 according to some embodiments. As shown in FIG. 4, a network device 410 is coupled to node 150. In some examples, switch 110 may generate and flood an ARP request packet for device 410. FIG. 4 shows one of the flooded requests as a packet 421 being forwarded to node 150 using VLT LAG 155. Node 150 may then forward packet 421 to device 410 as a packet 422. In response to the ARP request in packet 422, device 410 may transmit an ARP response packet 431 back to node 150. Node 150 may then forward the ARP response packet 431 to aggregate switch 130 using VLT LAG 155 where packet 431 is hashed to switch 120 as an ARP response packet 432.

Switch 120 begins the process of updating its own one or more forwarding information tables 126 based on the ARP response packet 432. Switch 120 also begins the process of notifying its peer switch, switch 110, of the ARP response packet 432.

In some examples, node 160 may then transmit a packet 441 for device 410. Node 160 forwards packet 441 to aggregate switch 130 using VLT LAG 165 which hashes packet 441 to switch 110. Unfortunately, switch 110 has not yet received the ARP response notification from switch 120 and drops a packet 442 and/or regenerates and floods a new ARP request for device 410. Consequently, it would be advantageous for switch 110 to receive the ARP response notification as rapidly as possible to avoid unnecessarily dropping packets and/or flooding duplicate ARP request packets on the network.

According to some embodiments, the undesirable behavior of the examples of FIGS. 2-4 may result from delays in notifications of forwarding information updates between switches 110 and 120. In each case, other nodes in the network (e.g., node 140 in the example of FIG. 2) are able to react faster to the new forwarding information and generate network traffic based on the new forwarding information before the peer switch is able to process and learn the new forwarding information. In an ideal world, packets (e.g., packets 232, 322, and/or 432) that are associated with new forwarding information could be hashed to all network links in a VLT LAG. This may not be practical as it may result in unnecessary duplication of packets. Additionally, it may not be possible for a VLT LAG in one node (e.g., node 140, 150, and/or 160) to know which forwarding information is already known to the aggregate switch 130 and may result in the duplication of every packet. This is generally undesirable. Thus, because the undesirable behavior is due to delays within the aggregate switch 130, it would be desirable for the aggregate switch 130 to improve its notification mechanisms.

Referring back to FIG. 1, one possible way to reduce notification delays is to remove and/or reduce the queuing delays of packet 172 in controller 114, processing time in controller 114, and/or queuing delays in forwarding packet 173. In some embodiments, the one or more ports 112 may be able to reduce notification delays by forwarding packet 171 not only to controller 114 as packet 172 (so that the one or more forwarding information tables 116 get updated), but also to switch 120 using ICL 135. Switch 120 may use its copy of the packet to discover any new forwarding information and update its one or more forwarding information tables 126 without having to wait for any further notification from switch 110. Simply forwarding a copy of packet 171, is not enough as headers in packet 171 do not record that packet 171 is received on VLT LAG 145. Thus, in some examples, packet 171 may need to be altered to record an ingress port or LAG on which packet 171 is received. In some examples, this may require that switches 110 and 120 associate ingress IDs to each of the possible ingress ports and/or LAGs used by the aggregate switch 130.

Figure 5:
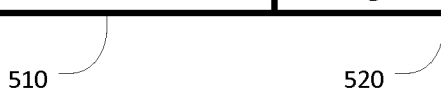
FIG. 5 is a simplified diagram of a reserved ingress ID table according to some embodiments.

FIG. 5 is a simplified diagram of a reserved ingress ID table 500 according to some embodiments. As shown in FIG. 5, the reserved ingress ID table 500 may be used to associate ingress IDs to ports and/or LAGs. The reserved ingress ID table 500 includes a column 510 for recording an ingress port and/or LAG and a column 520 for recording corresponding reserved ingress IDs. In some examples, the ingress port or LAG recorded in column 510 may be a switch and port combination (e.g., switch 110, port 3) or a LAG ID, respectively. In some examples, the reserved ingress IDs recorded in column 520 may be unique identifiers that cannot be confused with other identifiers and/or addresses used by an aggregate switch so that their use and/or presence in a packet clearly indicates that they are being used to designate a corresponding ingress port and/or LAG. As shown in FIG. 5, an ingress LAG 531 is associated with a reserved ingress ID 541, an ingress LAG 532 is associated with a reserved ingress ID 542, an ingress port 533 is associated with a reserved ingress ID 543, and an ingress LAG 539 is associated with a reserved ingress ID 549. Other ingress ports and/or LAGs in the aggregate switch may similarly be associated with reserved ingress IDs. Each of the switches in the aggregate switch need to maintain a copy of the reserved ingress ID table 500. According to some embodiments, the reserved ingress ID table may be included in one or more forwarding information tables maintained by each of the switches. In some examples, the reserved ingress ID table 500 may be included in the one or more forwarding information tables 116 and the one or more forwarding information tables 126. According to some embodiments, the reserved ingress ID table 500 may be generated during provisioning of each of the switches in the aggregate switch. In some examples, the reserved ingress ID table 500 may be generated using message passing between each of the switches.

Figure 6:
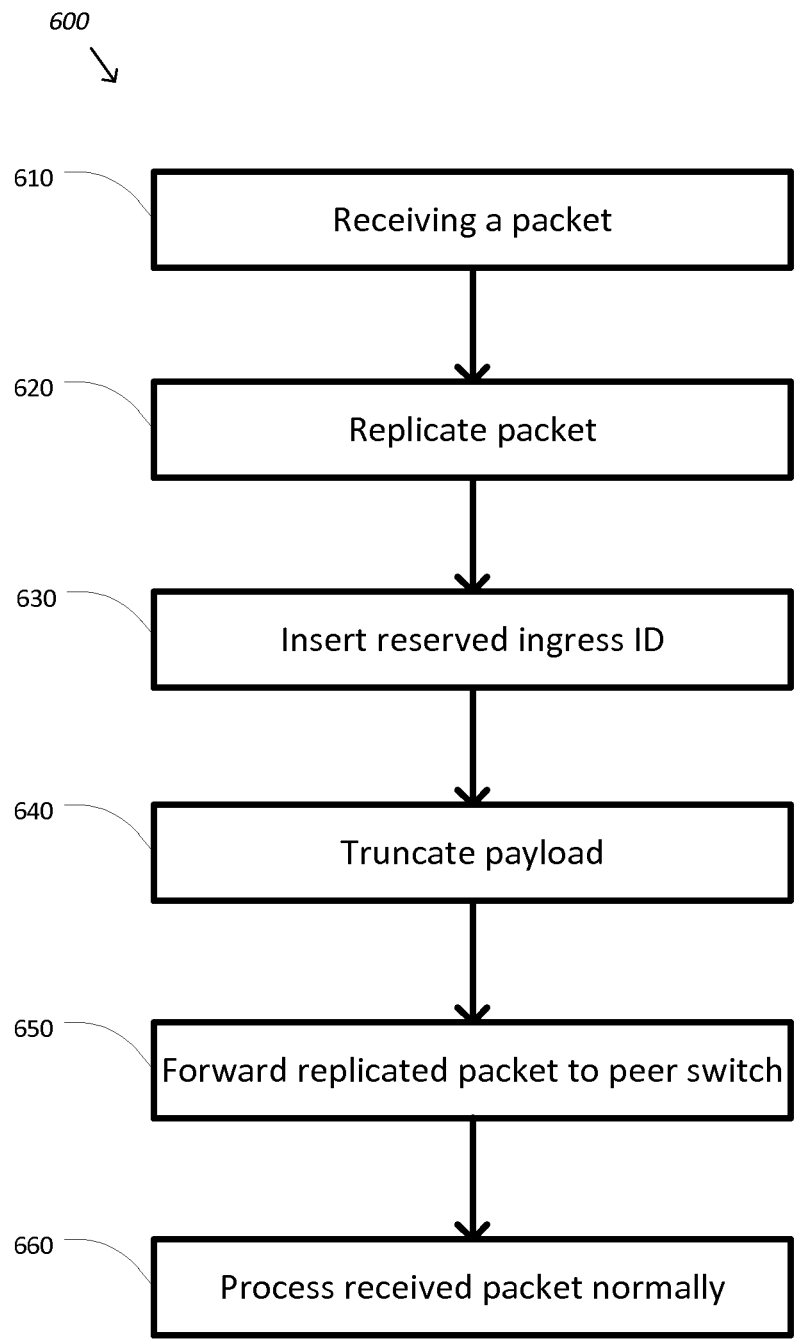
FIG. 6 is a simplified diagram showing a method of ingress packet handling using reserved ingress port IDs according to some embodiments.

FIG. 6 is a simplified diagram showing a method 600 of ingress packet handling using reserved ingress port IDs according to some embodiments. As shown in FIG. 6, the method 600 includes a process 610 for receiving a packet, a process 620 for replicating the packet, a process 630 for inserting a reserved ingress ID, a process 640 for truncating a payload, a process 650 for forwarding the replicated packet to a peer switch, and a process 660 for processing the received packet normally. According to certain embodiments, the method 600 of ingress packet handling using reserved ingress port IDs can be performed using variations among the processes 610-660 as would be recognized by one of ordinary skill in the art. In some embodiments, the process 640 may be omitted. In some embodiments, one or more of the processes 610-660 of method 600 may be implemented, at least in part, in the form of executable code stored on non-transient, tangible, machine readable media that when run by one or more processors (e.g., one or more processors in the controllers 114 and/or 124 and/or one or more processors associated with the one or more ports 112 and/or 122) may cause the one or more processors to perform one or more of the processes 610-660.

At the process 610, a packet is received. The packet is received from another switch, node, and/or device at an ingress port of a switch in an aggregate switch. In some examples, the packet may be associated with new forwarding information. In some examples, the ingress port may be associated with a LAG and/or a VLT LAG. In some examples, the LAG and/or the VLT LAG may include ports on more than one switch of the aggregate switch. In some examples, the ingress port may be a stand-alone port. In some examples, the received packet may be packet 171, 232, 322, and/or 432.

At the process 620, the packet is replicated. A copy of the received packet is made. In some examples, the packet is replicated in the hardware of the ingress port. In some examples, the packet is replicated in hardware associated with the ingress port. In some examples, a loopback port mechanism of the ingress port may be used to replicate the packet.

At the process 630, a reserved ingress ID is inserted. In order to designate where the aggregate switch received the packet during process 610, the reserved ingress ID is inserted into the replicated packet. In some examples, when the ingress port is associated with the LAG and/or VLT LAG, the reserved ingress ID corresponding to the LAG and/or VLT LAG may be inserted into the replicated packet. In some examples, when the ingress port is a stand-alone port, the reserved ingress ID corresponding to the ingress port may be inserted into the replicated packet. According to some embodiments, the reserved ingress ID may only be inserted into the replicated packet in place of a limited number of header fields. In some examples, the reserved ingress ID may replace a contents of a destination MAC header field. In some examples, the destination MAC header field may not be needed for the replicated packet because the replicated packet is to be automatically forwarded to a peer switch. In some examples, the presence of the reserved ingress ID tells the peer switch that the replicated packet is only being forwarded in order to convey the new forwarding information. In some examples, the reserved ingress ID may be included in a SRC-VIF header field (i.e., a virtual interface ID header field) in a VnTag header which may be added to the replicated packet as an optional header under IEEE 802.1BR.

At the optional process 640, the payload may be truncated. In some examples, because the received packet is only being replicated to convey new forwarding information, it may not be necessary to forward the payload in the replicated packet. In some examples, the payload of the received packet may be lengthy and forwarding a replicated copy of the payload would unnecessarily consume additional bandwidth.

At the process 650, the replicated packet is forwarded to the peer switch. The replicated packet may be forwarded to the peer switch using an ICL. In some examples, the replicated packet may be queued for forwarding to the peer switch using a high-speed and/or low latency queue. In some examples, the replicated packet may be forwarded using a LAG associated with the ICL. In some examples, the replicated packet may be forwarded using a virtual LAG created specifically for this purpose. In some examples, the virtual LAG may be associated with one or more of the ports associated with the ICL. According to some embodiments, when the switch has more than one peer switch in the aggregate switch, the replicated packet may be forwarded to all of the peer switches.

At the process 660, the received packet is processed normally. In some examples, the received packet may be forwarded to a controller of the switch. In some examples, the controller may use information associated with the received packet to update one or more forwarding information tables. In some examples, the received packet may be forwarded normally towards its destination. According to some embodiments, the process 660 may occur before the process 620 and/or in parallel with any of the processes 620-650.

Because one or more of the processes 610-650 may be implemented in the hardware of the ingress port and/or hardware associated with the ingress port, the replicated packet may be forwarded much more rapidly than the controller-based approach shown in FIG. 1. In some examples, the replicated packet may be received sufficiently quickly to avoid many of the problems associated with FIGS. 2-4 as well as other problems associated with delays in the notification of forwarding information updates required to maintain synchronization in the one or more forwarding information tables of switches within an aggregate switch.

Figure 7:
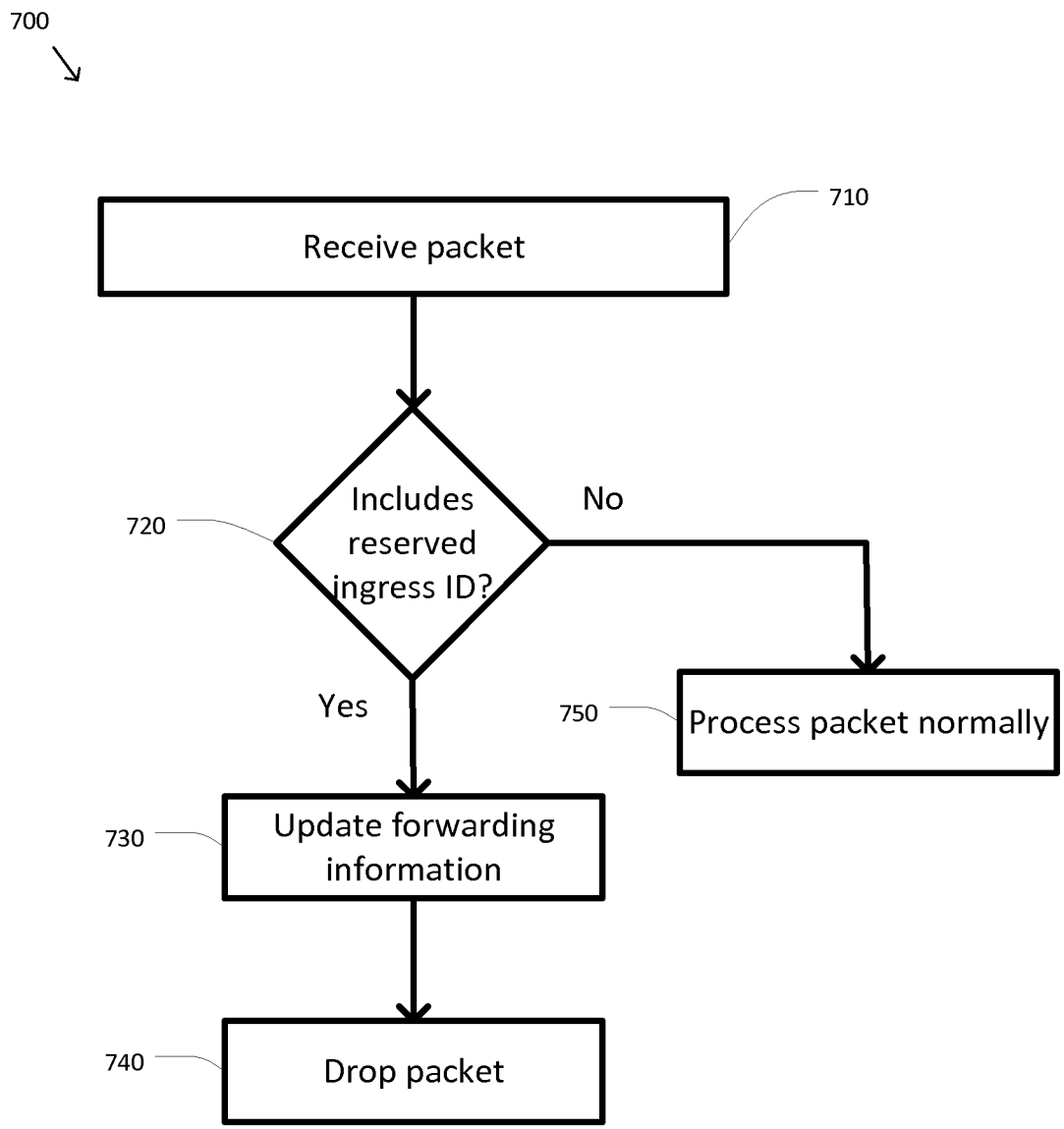
FIG. 7 is a simplified diagram showing a method of ingress packet handling using reserved ingress port IDs according to some embodiments.

FIG. 7 is a simplified diagram showing a method 700 of ingress packet handling using reserved ingress port IDs according to some embodiments. As shown in FIG. 7, the method 700 includes a process 710 for receiving a packet, a process 720 for determining whether the packet includes a reserved ingress ID, a process 730 for updating forwarding information, a process 740 for dropping the packet, and a process 750 for processing the packet normally. According to certain embodiments, the method 700 of ingress packet handling using reserved ingress port IDs can be performed using variations among the processes 710-750 as would be recognized by one of ordinary skill in the art. In some embodiments, one or more of the processes 710-750 of method 700 may be implemented, at least in part, in the form of executable code stored on non-transient, tangible, machine readable media that when run by one or more processors (e.g., one or more processors in the controllers 114 and/or 124 and/or one or more processors associated with the one or more ports 112 and/or 122) may cause the one or more processors to perform one or more of the processes 710-750.

At the process 710, a packet is received. In some examples, the packet may be received by a switch of an aggregate switch. In some examples, the switch may be switch 110 and/or switch 120. In some examples the packet may be received from a peer switch. In some examples, the packet may be received over an ICL. In some examples, the ICL may be the ICL 135. In some examples, the packet may be a packet transmitted by a peer switch during the process 650.

At the process 720, it is determined whether the packet includes a reserved ingress ID. In some examples a header field of the packet may be examined to determine whether it includes a reserved ingress ID. In some examples, the header field may be a destination MAC header field. In some examples, the header field may be a SRC-VIF header field in a VnTag header. In some examples, the reserved ingress ID may be identified by finding it in a reserved ingress ID table such as the reserved ingress ID table 500. In some examples, the reserved ingress ID may be found in column 520 of the reserved ingress ID table 500. In some examples, the reserved ingress ID may be associated with an ingress port and/or LAG on which the packet was originally received at the aggregate switch (e.g., during the process 610). In some examples, the reserved ingress ID may have been inserted into the packet by the peer switch during the process 630. When the packet includes a reserved ingress ID, the switch may further process the packet to determine any new forwarding information using the process 730. When the packet does not include a reserved ingress ID, the switch may process the packet normally using the process 750.

At the process 730, forwarding information may be updated. In some examples, the switch may examine the packet to determine whether the packet indicates any new forwarding information. In some examples, the reserved ingress ID may indicate the port and/or LAG on which the packet was originally received at the aggregate switch. Just as the peer switch is able to determine whether the packet indicates new forwarding information, the switch may do the same by examining the packet and noting the ingress port and/or LAG on which it was received and the contents of the packet. In some examples, when the reserved ingress ID indicates an unexpected ingress port and/or LAG that may occur after a MAC move, the switch may use this information to updates the one or more forwarding information tables of the switch to record the new port and/or LAG for reaching the device that has moved. In some examples, when the reserved ingress ID indicates new reachability information related to source addresses in the packet, the switch may update its one or more forwarding information tables accordingly. In some examples, when the reserved ingress ID is included in an ARP response packet, the switch may update its one or more forwarding information tables to include the ARP information.

At the process 740, the packet is dropped. In some examples, because the packet includes a reserved ingress ID, the switch may recognize that the packet has been forwarded merely to communicate the new forwarding information. As a result, the switch may drop the packet as it should not be forwarded or require further processing.

At the process 750, the packet is processed normally. When the packet does not include a reserved ingress ID, the switch should process the packet normally. In some examples, the packet may include management information associated with the aggregate switch and should be processed accordingly. In some examples, the packet may be part of network traffic being forwarded across the aggregate switch and should be forwarded accordingly.

Some embodiments of switches 110 and/or 120 may include non-transient, tangible, machine readable media that include executable code that when run by one or more processors may cause the one or more processors to perform the processes of methods 600 and/or 700 as described above. Some common forms of machine readable media that may include the processes of methods 600 and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device comprising:
   a controller;
   a first port coupling the network switching device to another network device; and
   one or more forwarding information tables being maintained by the controller;
   wherein the network switching device is configured to:
   receive a first packet at the first port;
   replicate the first packet;
   insert a first reserved ingress ID associated with the first port into the replicated first packet; and
   forward the replicated first packet to a first peer switch;
   wherein the network switching device is part of an aggregate switch.

2. The network switching device of claim 1 wherein:
   the first port is associated with a first link aggregation group (LAG); and
   the first reserved ingress ID is associated with the first LAG.

3. The network switching device of claim 2 wherein the first LAG is a virtual link trunking (VLT) LAG.

4. The network switching device of claim 1 wherein the first reserved ingress ID is stored in a reserved ingress ID table.

5. The network switching device of claim 4 wherein the one or more forwarding information tables includes the reserved ingress ID table.

6. The network switching device of claim 1 wherein the first packet is replicated using hardware associated with the first port.

7. The network switching device of claim 1 wherein the replicated first packet is forwarded to the first peer switch using an inter-chassis link (ICL).

8. The network switching device of claim 1 wherein the replicated first packet is forwarded to the first peer switch using a virtual LAG associated with an ICL.

9. The network switching device of claim 1 wherein the controller is configured to:
   receive the first packet;
   identify new forwarding information associated with the first packet; and
   update the one or more forwarding information tables based on the new forwarding information.

10. The network switching device of claim 1 wherein the replicated first packet is forwarded to the first peer switch using one selected from a group consisting of a high-speed queue and a low-latency queue.

11. The network switching device of claim 1 wherein the first reserved ingress ID is inserted into one selected from a group consisting of a destination MAC field in the replicated first packet and a virtual interface ID header field in a IEEE 802.1BR header in the replicated first packet.

12. The network switching device of claim 1 wherein the network switching device is further configured to truncate a payload of the replicated first packet before the replicated first packet is forwarded.

13. The network switching device of claim 1, further comprising:
   a second port;
   wherein the network switching device is further configured to:

receive a second packet at the second port;
replicate the second packet;
insert a second reserved ingress ID associated with the second port into the replicated second packet; and
forward the replicated second packet to the first peer switch.

14. The network switching device of claim 1 wherein the network switching device is further configured to:
receive a second packet from a second peer switch;
determine whether the second packet includes a second reserved ingress ID; and
when the second packet includes the second reserved ingress ID:
update the one or more forwarding information tables based on the second reserved ingress ID and information associated with the second packet; and
drop the second packet.

15. The network switching device of claim 14 wherein the first peer switch and the second peer switch are the same.

16. The network switching device of claim 1 wherein the aggregate switch is selected from a group consisting of a stacked switch and a peer group.

17. A method of ingress packet handling, the method comprising:
receiving a first packet at a first port coupling a network switching device to another network device;
replicating the first packet to form a replicated packet;
inserting a first reserved ingress ID associated with the first port into the replicated packet; and
forwarding the replicated packet to a peer switch.

18. The method of claim 17, further comprising:
receiving a second packet from the peer switch;
determining whether the second packet includes a second reserved ingress ID; and
when the second packet includes the second reserved ingress ID:
updating one or more forwarding information tables of the network switching device based on the second reserved ingress ID and information associated with the second packet; and
dropping the second packet.

19. An information handling system comprising:
an aggregate switch comprising:
a first network switching device comprising:
a first controller;
a port coupling the first network switching device to another network device; and
one or more first forwarding information tables being maintained by the first controller;
a second network switching device comprising:
a second controller; and
one or more second forwarding information tables being maintained by the second controller; and
an inter-chassis link (ICL) coupling the first network switching device to the second network switching device;
wherein the first network switching device is configured to:
receive a packet at the port;
replicate the packet;
insert a reserved ingress ID associated with the port into the replicated packet; and
forward the replicated packet to the second network switching device using the ICL.

20. The information handling system of claim 19 wherein the second network switching device is configured to:
receive the replicated packet;
determine whether the replicated packet includes the reserved ingress ID; and
when the replicated packet includes the reserved ingress ID:
update the one or more second forwarding information tables based on the reserved ingress ID and information associated with the replicated packet; and
drop the replicated packet.

* * * * *